United States Patent [19]
Banke et al.

[11] Patent Number: 5,651,646
[45] Date of Patent: Jul. 29, 1997

[54] HOLE SAW WITH WOOD REMOVAL FEATURE

[76] Inventors: Michael P. Banke, P.O. Box 277; George P. Banke, 1200 W. 4th St., both of Antioch, Calif. 94509-0027

[21] Appl. No.: 537,527

[22] Filed: Oct. 2, 1995

[51] Int. Cl.$^6$ .................................................. B23B 51/04
[52] U.S. Cl. ........................................... 408/204; 408/703
[58] Field of Search .................................. 408/204–209, 408/703

[56] References Cited

U.S. PATENT DOCUMENTS

| | | | |
|---|---|---|---|
| 2,978,002 | 4/1961 | Ransom | 408/205 |
| 3,758,221 | 9/1973 | Meshulam | 408/204 |
| 3,880,546 | 4/1975 | Segal | 408/204 |
| 5,246,317 | 9/1993 | Koetsch et al. | 408/204 |

FOREIGN PATENT DOCUMENTS

| | | | |
|---|---|---|---|
| 2302808 | 10/1976 | France | 408/703 |
| 2100075 | 7/1972 | Germany | 408/208 |

*Primary Examiner*—Steven C. Bishop

[57] ABSTRACT

A hole saw with wood removal feature comprised of a drill portion having a cylindrical engagement portion secured thereto. The cylindrical engagement portion has two projections on a lower surface thereof. The device includes a cylindrical hole saw portion having a planar upper end, an open lower end, and a cylindrical side wall therebetween. The planar upper end has a central aperture formed therethrough and a pair of small apertures being diametrically opposed from each other outside of the central aperture. The central aperture receives the drill portion therethrough with the two projections coupling with the pair of small apertures. The open lower end opens into a hollow interior cavity. The open lower end has a plurality of cutting teeth formed on an outer edge thereof. The cylindrical hole saw has an angular slot formed therein extending from the open lower end to a position beneath the planar upper end.

1 Claim, 2 Drawing Sheets

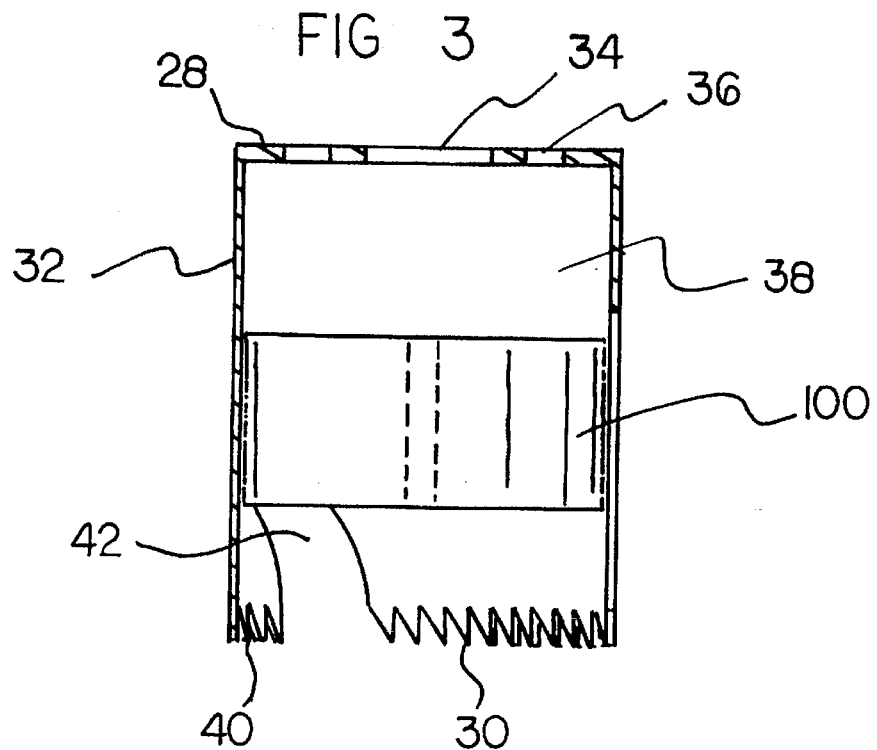
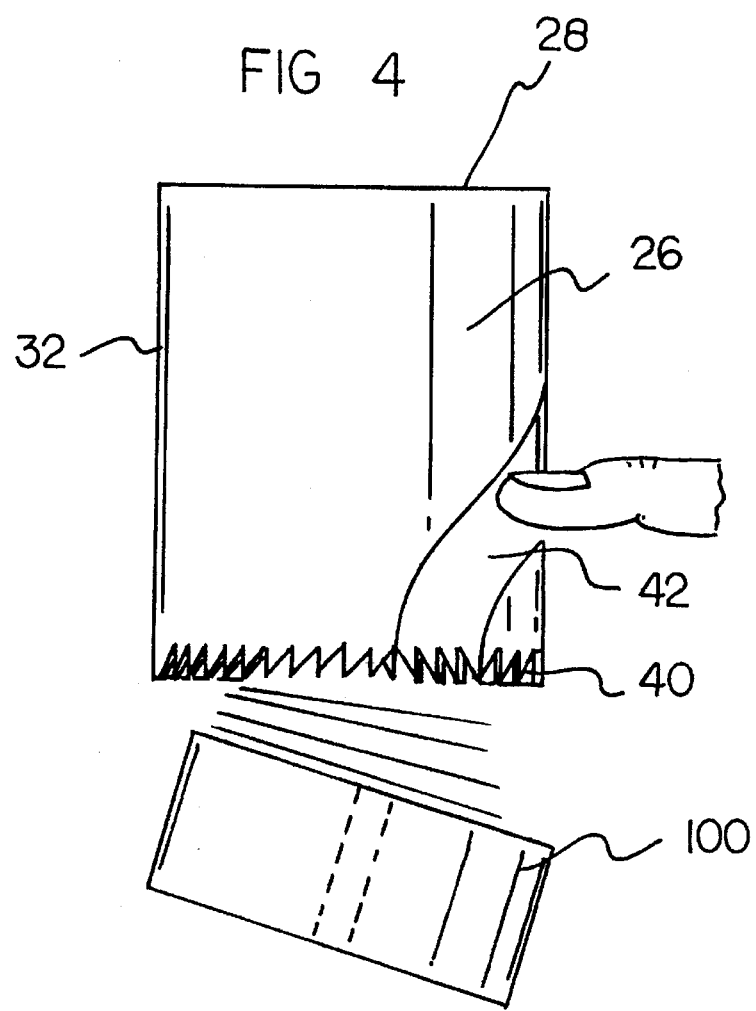

HOLE SAW WITH WOOD REMOVAL FEATURE

BACKGROUND OF THE INVENTION

1. Field of the Invention

The present invention relates to a hole saw with wood removal feature and more particularly pertains to cutting holes in wood and easily removing the wood from the hole saw with a hole saw with wood removal feature.

2. Description of the Prior Art

The use of hole saws is known in the prior art. More specifically, hole saws heretofore devised and utilized for the purpose of cutting holes in wood are known to consist basically of familiar, expected and obvious structural configurations, notwithstanding the myriad of designs encompassed by the crowded prior art which have been developed for the fulfillment of countless objectives and requirements.

By way of example, U.S. Pat. No. Des. 303,118 to Cox discloses the ornamental design for a hole saw.

U.S. Pat. No. 5,096,341 to Despres discloses a hole saw and drive including a cup shaped saw body having a closed end a plurality of teeth.

U.S. Pat. No. 4,279,551 to Wilterding discloses a hole saw pilot pin with plug retrieval mechanism having a catch pinned or screwed to a conventional hole saw pilot pin.

U.S. Pat. No. 4,755,087 to Parent discloses a hole saw plug ejector.

U.S. Pat. No. 5,246,317 to Koetsch et al. discloses a quick-release arbor for hole saws.

While these devices fulfill their respective, particular objective and requirements, the aforementioned patents do not describe a hole saw with wood removal feature for cutting holes in wood and easily removing the wood from the hole saw.

In this respect, the hole saw with wood removal feature according to the present invention substantially departs from the conventional concepts and designs of the prior art, and in doing so provides an apparatus primarily developed for the purpose of cutting holes in wood and easily removing the wood from the hole saw.

Therefore, it can be appreciated that there exists a continuing need for new and improved hole saw with wood removal feature which can be used for cutting holes in wood and easily removing the wood from the hole saw. In this regard, the present invention substantially fulfills this need.

SUMMARY OF THE INVENTION

In the view of the foregoing disadvantages inherent in the known types of hole saws now present in the prior art, the present invention provides an improved hole saw with wood removal feature. As such, the general purpose of the present invention, which will be described subsequently in greater detail, is to provide a new and improved hole saw with wood removal feature and method which has all the advantages of the prior art and none of the disadvantages.

To attain this, the present invention essentially comprises a drill portion having a first end portion, a second end portion, and an intermediate extent therebetween. The first end portion is adapted for coupling with a drill. The second end portion is adapted for boring a hole in wood. The intermediate extent has a cylindrical engagement portion secured thereto. The cylindrical engagement portion has two projections on a lower surface thereof. The device includes a cylindrical hole saw portion having a planar upper end, an open lower end, and a cylindrical side wall therebetween. The planar upper end has a central aperture formed therethrough and a pair of small apertures being diametrically opposed from each other outside of the central aperture. The central aperture receives the drill portion therethrough with the two projections coupling with the pair of small apertures. The open lower end opens into a hollow interior cavity. The open lower end has a plurality of cutting teeth formed on an outer edge thereof. The cylindrical hole saw has an angular slot formed therein extending from the open lower end to a position beneath the planar upper end. The angular slot extends about two-thirds the overall length of the cylindrical hole saw.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved hole saw with wood removal feature which has all the advantages of the prior art hole saws and none of the disadvantages.

It is another object of the present invention to provide a new and improved hole saw with wood removal feature which may be easily and efficiently manufactured and marketed.

It is a further object of the present invention to provide a new and improved hole saw with wood removal feature which is of durable and reliable construction.

An even further object of the present invention is to provide a new and improved hole saw with wood removal feature which is susceptible of a low cost of manufacture with regard to both materials and labor, and which accordingly is then susceptible of low prices of sale to the consuming public, thereby making such a hole saw with wood removal feature economically available to the buying public.

3

Still yet another object of the present invention is to provide a new and improved hole saw with wood removal feature which provides in the apparatuses and methods of the prior art some of the advantages thereof, while simultaneously overcoming some of the disadvantages normally associated therewith.

Even still another object of the present invention is to provide a new and improved hole saw with wood removal feature for cutting holes in wood and easily removing the wood from the hole saw.

Lastly, it is an object of the present invention to provide a new and improved hole saw with wood removal feature comprised of a drill portion having a cylindrical engagement portion secured thereto. The cylindrical engagement portion has two projections on a lower surface thereof. The device includes a cylindrical hole saw portion having a planar upper end, an open lower end, and a cylindrical side wall therebetween. The planar upper end has a central aperture formed therethrough and a pair of small apertures being diametrically opposed from each other outside of the central aperture. The central aperture receives the drill portion therethrough with the two projections coupling with the pair of small apertures. The open lower end opens into a hollow interior cavity. The open lower end has a plurality of cutting teeth formed on an outer edge thereof. The cylindrical hole saw has an angular slot formed therein extending from the open lower end to a position beneath the planar upper end.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional view of the present invention as taken along line 3—3 of FIG. 2.

FIG. 4 is a front elevation view of the present invention illustrating the removal feature.

The same reference numerals refer to the same parts through the various Figures.

DESCRIPTION OF THE PREFERRED EMBODIMENT

Figure 1:
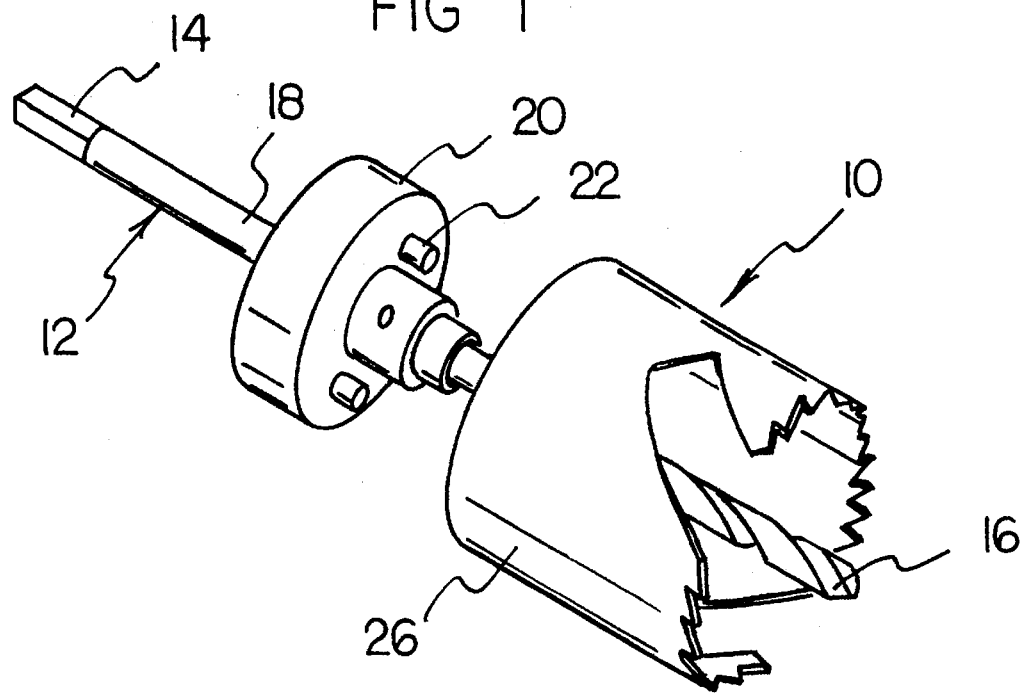
FIG. 1 is a perspective view of the preferred embodiment of the hole saw with wood removal feature constructed in accordance with the principles of the present invention.
Figure 2:
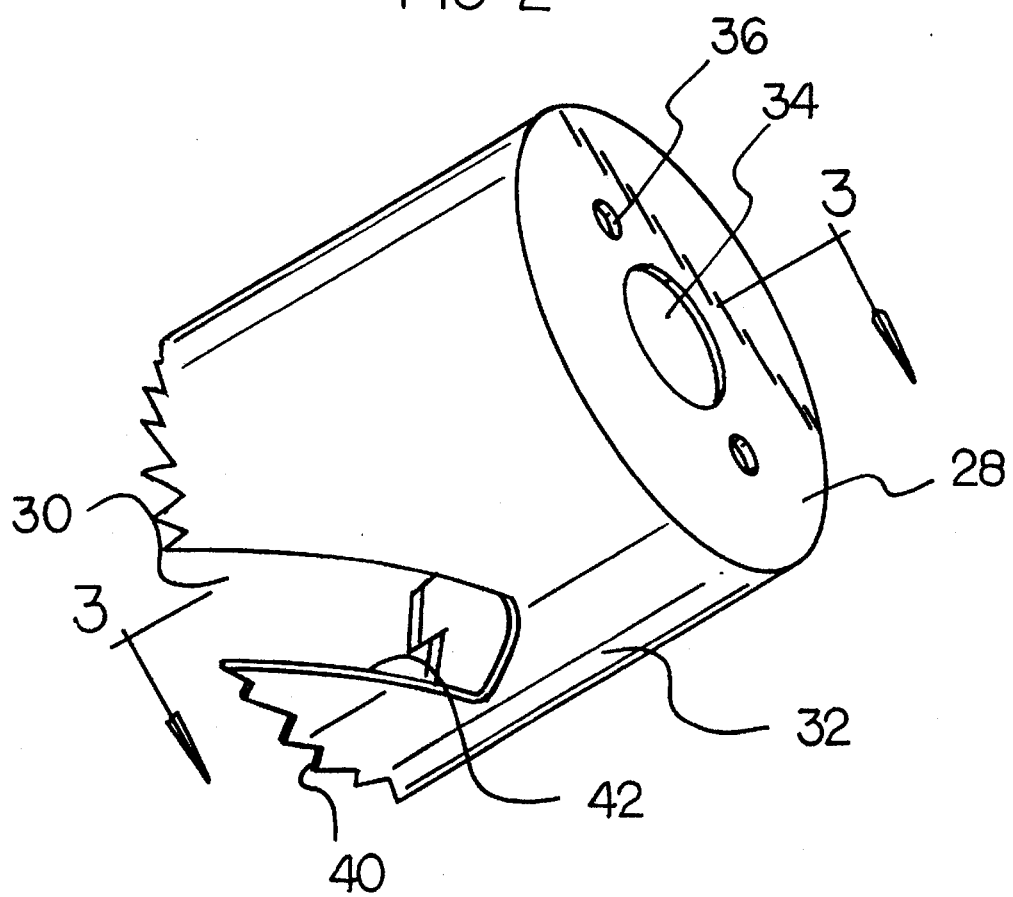
FIG. 2 is a rear perspective view of the present invention.

With reference now to the drawings, and in particular, to FIG. 1 thereof, the preferred embodiment of the new and improved hole saw with wood removal feature embodying the principles and concepts of the present invention and generally designated by the reference number 10 will be described.

Specifically, it will be noted in the various Figures that the device relates to a new and improved hole saw with wood removal feature for cutting holes in wood and easily removing the wood from the hole saw. In its broadest context, the device consists of a drill portion and a cylindrical hole saw portion. Such components are individually configured and correlated with respect to each other so as to attain the desired objective.

The device 10 includes a drill portion 12 having a first end portion 14, a second end portion 16, and an intermediate extent 18 therebetween. The first end portion 14 is adapted for coupling with a drill. The second end portion 16 is adapted for boring a hole in wood. The intermediate extent 18 has a cylindrical engagement portion 20 secured thereto. The cylindrical engagement portion 20 has two projections 22 on a lower surface thereof. The drill portion 12 can be used separately from other components of the device 10 to simply bore small holes in a piece of wood.

The device 10 also includes a cylindrical hole saw portion 26 having a planar upper end 28, an open lower end 30, and a cylindrical side wall 32 therebetween. The planar upper end 28 has a central aperture 34 with a smooth periphery, as shown in the Figures, formed therethrough and a pair of small apertures 36 being diametrically opposed from each other outside of the central aperture 34. The central aperture 34 receives the drill portion 12 therethrough with the two projections 22 coupling with the pair of small apertures 36. The open lower end 30 opens into a hollow interior cavity 38. The open lower end 30 has a plurality of cutting teeth 40 formed on an outer edge thereof. As best shown in FIG. 4, the teeth have a thickness equal to that of the cylindrical side wall of the hole saw portion. The cylindrical hole saw 26 has a pair of diametrically opposed angular slots 42 formed therein extending from the open lower end 30 to a position beneath the planar upper end 28 thereby defining a pair of sections in the outer edge of the open lower end. As shown in the Figures, each section has a plurality of teeth formed therein. The pair of angular slots 42 are each positioned on opposite sides of the hole saw portion and extend linearly about two-thirds the overall length of the cylindrical hole saw in a direction similar to that which the teeth extend. Once the cylindrical hole saw 26 is secured to the drill portion 12, and the drill portion is couple with an electric drill, a hole can be bored through a piece of wood. The piece of wood 100 that is removed from the bored hole is then lodged in the cylindrical hole saw 26. The user simply reaches their forefinger and thumb into the diametrically opposed angular slots 42 to easily remove the piece of wood 100 from the cylindrical hole saw 26. The angular slots 42 also provide a means of cooling the device 10, thus preventing overheating of the device 10.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A hole saw with wood removal feature for cutting holes in wood and easily removing the wood from the hole saw comprising, in combination:

a drill portion having a first end portion, a second end portion, and an intermediate extent therebetween, the first end portion being adapted for coupling with a drill, the second end portion being adapted for boring a hole in wood, the intermediate extent having a cylindrical engagement portion secured thereto, the cylindrical engagement portion having two projections on a lower surface thereof;

a cylindrical hole saw portion having a planar upper end, an open lower end, and a cylindrical side wall therebetween, the planar upper end having a central aperture formed therethrough and a pair of small apertures being diametrically opposed from each other outside of the central aperture, the central aperture receiving the drill portion therethrough with the two projections coupling with the pair of small apertures, the open lower end opening into a hollow interior cavity, the open lower end having a plurality of cutting teeth formed on an outer edge thereof, the cylindrical hole saw having a pair of diametrically opposed angular slots formed therein extending from the open lower end to a position beneath the planar upper end thereby defining a pair of sections in the outer edge of the lower end wherein each section has a plurality of teeth formed therein, the teeth having a thickness equal to that of the cylindrical side wall of the hole saw portion, the pair of angular slots each positioned on opposite sides of the hole saw portion and extending linearly about two-thirds the overall length of the cylindrical hole saw in a direction similar to that which the teeth extend.

* * * * *